W. G. TURNER.
TOOTH FILLING.
APPLICATION FILED SEPT. 29, 1919.
1,349,592.
Patented Aug. 17, 1920.
Fig.1,
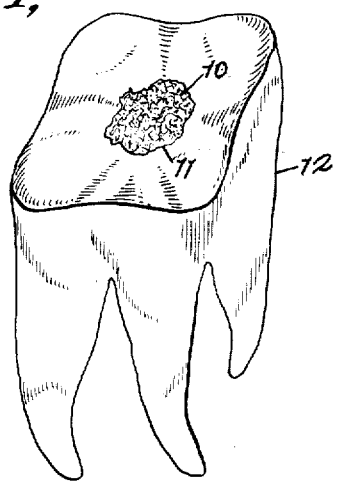
Fig.2,
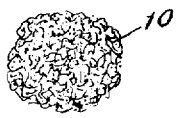
Inventor
William G. Turner.
By his Attorney
W. T. Criswell.

UNITED STATES PATENT OFFICE.

WILLIAM G. TURNER, OF BROOKLYN, NEW YORK.

TOOTH-FILLING.

1,349,592.   Specification of Letters Patent.   Patented Aug. 17, 1920.

Application filed September 29, 1919. Serial No. 327,233.

*To all whom it may concern:*

Be it known that I, WILLIAM G. TURNER, a citizen of the United States, and a resident of New York, borough of Brooklyn, in the county of Kings and State of New York, have invented a certain new and useful Improvement in Tooth-Fillings, of which the following is a full, clear and exact specification.

This invention relates to a class of dental materials, and has for its object to provide a form of filling designed to be employed in cavities of the teeth of persons to prevent the admission of air, moisture and foreign substances during periods when the teeth are undergoing treatment as well as serving advantageously as a toothache remedy, the invention contemplating the provision of a filling mainly for temporary rather than for permanent use. The invention consists essentially of providing an absorbent fibrous filling material which is impregnated with a cementitious material adapted to solidify when contacted with water so that the fibrous material on being packed in the cavity of a tooth will solidify and harden when subjected to water taken in the mouth of the person by the solidification of the cementitious material.

Other objects of the invention are to provide the cementitious material in liquid form so that the fibrous material and the liquid may be kept separately and employed by being combined at the time of filling the cavity; and to provide if desired an antiseptic in the liquid for serving as a germicide for diseased teeth.

With these and other objects in view, the invention will be hereinafter more particularly described with reference to the accompanying drawing forming a part of this specification in which similar characters of reference indicate corresponding parts in all the views and will then be pointed out in the claims at the end of the description.

In the drawing, Figure 1 is a perspective view of a tooth having a cavity filled with my improved filling, and Fig. 2 is a view of a portion of the absorbent fibrous material used in the filling.

In practice my dental filling is provided by employing a fibrous material, such as absorbent cotton, as 10, of sufficient quantity when firmly packed to fill the cavity, as 11, of a tooth, as 12. Prior to packing the absorbent fibrous filling 10, the portion selected for use is impregnated with a cementitious material adapted to solidify and harden when contacted by water. This cementitious material is preferably used in a liquid form, and while a number of various well known vegetable gums may be employed I prefer to use gum sandarac, four grams and gum camphor, two grams. These ingredients are dissolved in approximately sixty-four cubic centimeters of alcohol in a suitable container. In conjunction with these ingredients I may also employ an antiseptic, such as two grams of methyl salicylate which is dissolved in the alcohol with the sandarac and camphor.

This liquefied cementitious material is ordinarily kept separate from the absorbent fibrous filling material, and when a cavity of a tooth is filled the required portion of the material is thoroughly saturated with the liquid. By the use of a suitable implement the saturated filler is packed tightly in the cavity of the tooth, and the filling on being subjected to water by the person holding a quantity in the mouth will neutralize the solvent action of the alcohol to cause the sandarac and camphor to solidify and harden to a degree for effectually serving mainly as a temporary filling. The filling when hard will be practically impervious to moisture and the admission of air into the cavity for tending to prevent aching of the tooth from an exposed nerve or exposed sensitive dentine, and the methyl salicylate will serve as an antiseptic remedy for tendency of the tooth structure to decay. Thus a simple and efficient filling is provided for the cavitous teeth of persons especially when aching from exposure, and which may be advantageously employed for teeth when undergoing treatment.

In the foregoing description, I have embodied the preferred form of my invention, but I do not wish to be understood as limiting myself to the exact formula of the liquid cementitious material herein designated as I am aware that other ingredients may be substituted for one or a number of them, therefore I reserve to myself the right to make such changes as fairly fall within the spirit of the invention.

Having thus described my invention, I claim as new and desire to secure by Letters Patent:—

1. A tooth filling, consisting of an absorbent fibrous filling, and a liquefied cementitious material with which the fibrous filling is saturated, said filling being adapted to solidify and harden when subjected to water.

2. A tooth filling, consisting of an absorbent fibrous filling, a liquid cementitious material with which the fibrous filling is saturated, said filling being adapted to solidify and harden when subjected to water, and an antiseptic in the liquid.

3. A tooth filling, consisting of a fibrous filling material impregnated with a cementitious material adapted to solidify and harden when subjected to water.

4. A tooth filling, consisting of a fibrous filling material impregnated with a cementitious material adapted to solidify and harden when subjected to water, and an antiseptic mixed in the cementitious material.

5. A tooth filling, consisting of absorbent cotton, and a liquefied cementitious gum saturating the cotton, said gum being adapted to solidify and harden when subjected to water.

6. A tooth filling, consisting of absorbent cotton, a liquefied cementitious gum, and an antiseptic contained in the liquid, said gum being adapted to solidify and harden when subjected to water.

7. In a tooth filling, a liquid cementitious material for saturating a fibrous filling whereby the filling will solidify and harden when subjected to water.

8. In a tooth filling, a liquid cementitious material for saturating a fibrous filling whereby the filling will solidify and harden when subjected to water, and an antiseptic in the liquid.

9. In a tooth filling, a liquefied cementitious material for saturating a fibrous filling whereby the filling will solidify and harden when subjected to water, consisting of gum sandarac and gum camphor dissolved in alcohol.

This specification signed and witnessed this 27th day of September A. D. 1919.

WILLIAM G. TURNER.

Witnesses:
A. E. SCOTT,
J. FREDERICK CRYER.